Dec. 29, 1936.　　　E. M. JENKINS　　　2,066,005
BUILDING WALL
Filed Jan. 10, 1936
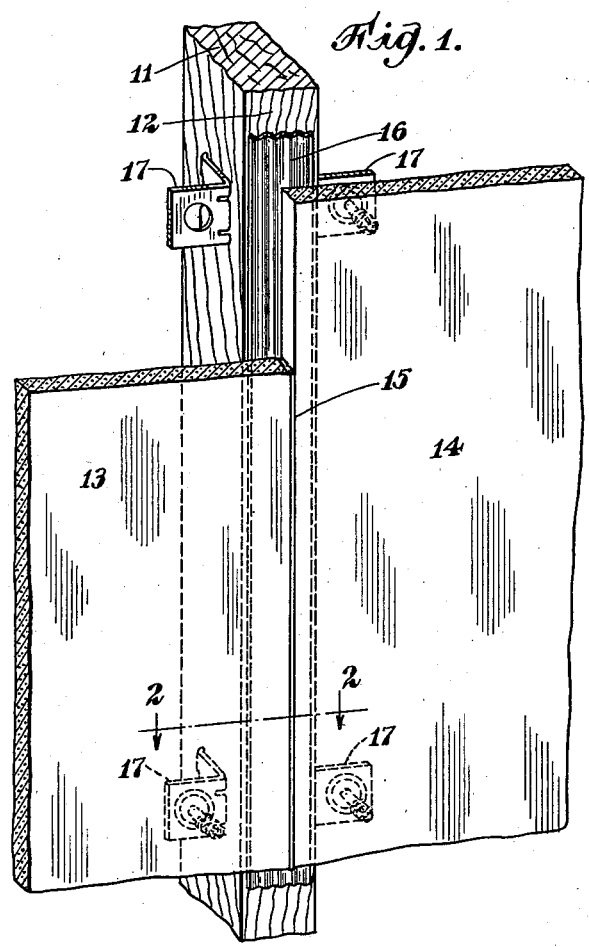
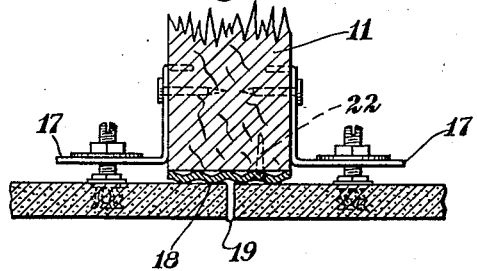
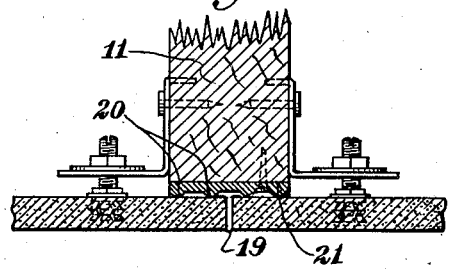
INVENTOR.
Edward M. Jenkins.
BY D. N. Halstead.
ATTORNEY.

Patented Dec. 29, 1936

2,066,005

UNITED STATES PATENT OFFICE 2,066,005

BUILDING WALL

Edward M. Jenkins, Somerville, N. J., assignor to Johns-Manville Corporation, New York, N. Y., a corporation of New York Application January 10, 1936, Serial No. 58,534

6 Claims. (Cl. 72—16)

This invention relates to a building assembly including a ridged gasketing strip.

There is extensive use in building assemblies of preformed panels or units of facing material supported upon studs, the term "studs" being used herein to include beams or rafters as well as vertical support members. In closing the joint between the said units and the faces of the stud, cork flashing strips or the like of generally plane surfaces have been used and suitable means have been employed to hold the units to the studs and tightly against the flashing strips.

With bendable facing units, such, for example, as those constituted of a compressed and hardened intimate mixture of asbestos and Portland cement, the pressure required, at spaced positions, to hold the edges of the units sufficiently tightly against the cork gasket may cause bowing of the edge of the unit at portions between the said positions. With other units, difficulty may be experienced in making conveniently a tight joint. Thus, certain units may break or others may bend under the pressure required in making a tight joint.

There is need, therefore, of a gasket that is adapted to provide thorough flashing and give a wind and rain-tight assembly at the joint portion between adjacent units of finishing material, without the need of such pressure as to deform substantially any element of the assembly, except the flashing or gasketing strip itself or a member made purposely springy.

It is an object of the present invention to provide such a strip gasket and assembly. Other objects and advantages will appear from the detailed description that follows.

The invention comprises the novel features hereinafter described in connection with the assembly including a strip gasket, and, particularly, an assembly including studs, units forming a joint between the side edges thereof and in front of the face of a stud, and a resiliently compressible gasket disposed between the joint and stud and provided with ridges extending longitudinally, on both sides of the said joint, the facing units being held tightly against the gasket and to a stud support.

An embodiment of the invention that is preferred is illustrated in the attached drawing and the invention will be further illustrated by description in connection with the drawing.

Fig. 1 shows a perspective view, partly broken away for clearness of illustration, of my improved building assembly.

Fig. 2 shows a sectional view on line 2—2 of Fig. 1.

Fig. 3 shows a similar sectional view of an embodiment of the invention utilizing a modified form of flashing strip.

There are shown parts of a supporting substructure including studs 11 of wood or other suitable material provided with plane faces 12, units of facing material 13 and 14 meeting at their edges in flush relationship to form therebetween a joint 15, a resiliently compressible gasket strip 16 disposed between the said joint and face of the stud, and means 17, such as springy bracket clips, holding the said units to the stud and tightly against the gasket 16.

The gasket is provided with ridges 18 preferably on the face thereof that is in contact with the units of facing material.

The ridges extend longitudinally, that is, lengthwise of the strip gasket, and generally parallel to the direction of extent of the said joint. Also, one or more of the ridges lie on opposite sides of the joint, so that proper flashing is produced and entrance of wind or rain at either side of the joint is prevented.

If desired, the joint may be closed at its forward portion by a springy, continuous bead member 19 or by other suitable means. In some instances, mastic may be used.

The strip may be secured to the stud by any suitable means, as, for example, by nail 22.

In the embodiment that is at this time preferred, the flashing strip is a corrugated member of no substantial internal strain, when in the corrugated condition, and adapted to be subject to internal strain and to tend to return to the original corrugated shape, when deformed under stress therefrom.

In making such a corrugated strip, the selected composition is preferably shaped in substantially rectangular form, that is, for example, into a strip of generally plane back and face and without internal strain. Thus, there may be formed a slab of rectangular cross section of natural cork or a strip including granules of cork bonded with a plasticized resinous phenol-aldehyde condensation product, as, for example, as described in U. S. Patent 1,960,374 issued to Edmonds on May 29, 1934, in the passage extending from page 2, line 98, to page 3, line 5. A strip so made is then scored or cut as by emery wheels or the like, to provide the longitudinally ridged surface or lengthwise corrugation illustrated.

A strip so made is to be distinguished from a strip made from a composition set in a form with plane face and back and then shaped under stress, the latter strip exerting a tendency to return to the shape in which it was originally set.

In the embodiment shown in Fig. 3, there is used a strip provided with longitudinally extending ridges 20 on one face thereof and a back or rear face 21 of generally plane surface contacting with and conforming to a face of the stud. Such a strip is made preferably by cutting or scoring the face only of a resilient composition originally set in a shape having generally plane face and back.

In a structure of the kind described, the pressure holding the facing units against the strip gasket is concentrated on relatively small areas confined to the tops of the ridges, or, there is a small area only of contact between the gasket and facing units. As a result, there is a zone of thorough flashing on each side of the joint, without the need of the application of such pressure by the fastening means 17 or the like as to cause distortion or injury of the facing units. Thus, an assembly is provided in which the springy fastening means is not required to exert a large compressive force and consequently may be made of light, inexpensive material, and yet, through cooperation with the particular type of gasket shown, create a permanent, water and wind-tight joint without placing sufficient stress on any of the various structural members to distort or fracture them.

In the embodiment shown in Figs. 1 and 2, the flashing or gasket strips are also bendable, bending, if produced, being accomplished by partial flattening out of the corrugations. This bending, coupled with the natural tendency of the strips to remain corrugated, promotes continuous contact between the flashing strip and the edge portion of the facing unit.

While various dimensions may be used, I have employed to advantage corrugated cork composition filler strips, made in accordance with the method described in the said patent to Edmonds, that are 1⅝ inches wide, of ⅛ inch actual thickness at a given point, and $\frac{3}{16}$ inch overall thickness. Such a strip may be formed by ridging, as with emery wheels, a flat cork strip originally $\frac{3}{16}$ inch thick. It has been found that a typical specimen of ridged cork composition gasket strip so made undergoes a decrease in overall thickness of 0.070 inch under a compression of 10 pounds to the square inch, as compared to a decrease of only 0.003 inch for a similar strip of the same dimensions as to width and overall thickness, but having all surfaces plane instead of corrugated face and back.

It will be understood that the details given are for the purpose of illustration, not restriction, and that variations within the spirit of the invention are intended to be included within the scope of the appended claims.

What I claim is:

1. A building assembly comprising a stud, units of facing material of generally plane surface meeting in flush relationship at their edges to form a joint therebetween and in front of the face of the stud, a resiliently compressible strip gasket disposed between the said joint and face of the stud, and means securing the said units to the stud and tightly against the gasket, the said gasket having, on the face thereof in contact with the said units, ridges extending longitudinally on both sides of the said joint, so as to provide relatively small areas of contact of the said units against the gasket.

2. An assembly, as described in claim 1, the said gasket being provided with a generally plane back contacting with and conforming to the face of the stud.

3. An assembly, as described in claim 1, the said ridges consisting of corrugations extending in direction approximately parallel to the direction of extent of the said joint.

4. A building assembly comprising a stud, units of facing material forming a junction adjacent said stud, a resiliently compressible gasket positioned between the stud and the junction, the gasket having ribs extending longitudinally on opposite sides of the junction and in contact with said units, and spring means connecting the units with the stud so as to compress the gasket between the stud and units to form an effective seal.

5. A building assembly comprising a stud, units of facing material forming a junction adjacent said stud, a resiliently compressible gasket positioned between the stud and the junction, the gasket having ribs extending longitudinally on opposite sides of the junction and in contact with said units, and spring means having a portion connected with the faces of the units on the same side as the stud and invisible on the opposite faces, and another portion attached to the stud so as to compress the gasket between the stud and units to form an effective seal.

6. A building assembly comprising a frame member of the type of a stud, a unit of facing material contiguous to said member, a resiliently compressible, corrugated gasket positioned between the frame member and the unit, and spring means connecting the frame member and unit and compressing the gasket therebetween.

EDWARD M. JENKINS.